INVENTORS
E. PRIESTAS
A.I. REICHERT
BY Robert E. Berger
ATTORNEY

INVENTORS
E. PREISTAS
A. I. REICHERT
BY Robert E. Berger
ATTORNEY

United States Patent Office 3,313,112
Patented Apr. 11, 1967

3,313,112
ROCKET RECOVERY APPARATUS
Arlen I. Reichert, Lutherville, and Edward Priestas, Baltimore, Md., assignors to Martin Marietta Corporation, New York, N.Y., a corporation of Maryland
Filed Apr. 30, 1964, Ser. No. 363,923
17 Claims. (Cl. 60—200)

This invention relates to a device and system for protecting rocket engines and, more specifically, it relates to arrangements for encapsulating the engine portion of a rocket booster body with an impact-resisting foamable mixture so as to effect its recovery from flight in a salvable condition.

With the advent of large and costly rocket-powered booster vehicles the desirability for schemes allowing an effective recovery of the vehicular following flight has become increasingly apparent. Cost savings resulting from the improved recovery of boosters may be realized not only from more accurate flight analyses of spent boosters, but also it may be recognized that refurbishing of engine portions of the boosters for reuse will result in substantially influencing flight program costs.

To the present time, however, recovery programs have been somewhat restrictive. Typically, following a suborbital flight, the recovery procedure commences as a parachute in appropriate connection with the booster is utilized to lower the expended vehicle to earth—in most cases into the sea. While this existing procedure may effectively control attitude during descent, damages associated with impact and exposure with sea water for the most part have frustrated successful salvage operations. Looking to re-entry technique in more detail, at a point in time following engine shutdown, a large size booster will separate from forward rocket vehicle portions and utilize one or a series of extended parachutes to effect deceleration to an approximately 90 ft./sec. sinking speed. Retarding rockets may then be actuated to further reduce speed of descent to about 5 ft./sec. Unfortunately, the inherently fragile nature of conventionally designed booster structures often renders them incapable of withstanding impact with sea water even at these restricted speeds of descent. Rupture of booster tankage may result in the sinking of the entire booster, thereby complicating or rendering impossible the recovery operation. Additionally, the impact may deform exposed engine components leading to costly reworking or abandonment and scrapping.

Of course, immersion of critical rocket components in sea water will immediately set in motion a corroding activity which tends to intensify in proportion to lapsed immersion time. This corrosive action is particularly detrimental to the exposed engine portions of boosters.

The invention as now presented offers solution to the deficiencies as outlined above and others by providing a shock absorbing and buoyant protective enclosure about exposed booster engine parts.

The aforesaid enclosure is formed about rocket engines following their operation by enclosing them within a retractable or collapsible canopy extensible about the engine region and into which quick-curing, foaming agents are sprayed. The water resistant foam body thereby formed will isolate the engine by encapsulation, providing both protection from shock at surface contact, and from sea water corrosion. The encapsulating arrangement of the invention may be formed so as to provide an incremental or progressive distribution of the shock forces at impact and will further provide floatation for the entire booster body in the event of tank rupture or the like, thereby greatly simplifying recovery.

Another object of the invention is the provision for spraying a silicone mixture or mist upon the engine components prior to foam encapsulation. The isolating covering deposited upon the engine components will facilitate the ultimate removal of the foamatious covering and further enhance resistance to corrosion.

One embodiment of the invention provides a dual form canopy, its members having two portions residing while retracted in advantageous compact form upon the booster body spaced in a noninterfering position from the engines during normal operation and flight, both portions being extensible over part of the engine region and joining thereover to encapsulate the engine at a given point in time during descent of the booster body.

Further, the canopy member may be formed of rib members supporting a flexible fabric covering, the said rib members serving the additional function as conduits for the delivery of foaming agents, curing agents, silicone insulating materials, and the like into the enclosed engine region. Certain of the canopy ribs may also be formed so as to distribute water impact loads about the vehicle structure in a graduated manner.

Additionally, it is an object to provide a booster recovery system having a sequence of operation in which at a given point in time during descent of the booster the rocket engines are purged of fuels, the above-described canopy encloses the engine portions, a silicon base mix is sprayed into the engine components and a rapidly curing foamatious mixture are introduced into the canopy enclosure so as to effectively encapsulate the engine portion of the booster.

These and other objects of the invention are further described and illustrated by the following discussion and related drawings in which.

Figure 1:
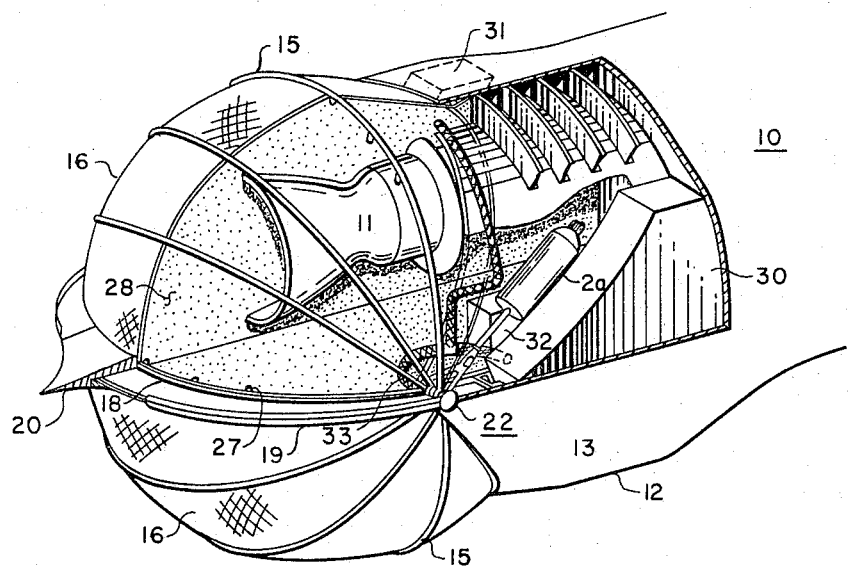
FIGURE 1 is a perspective drawing showing in cutaway fashion one embodiment of the present invention.

Referring to FIGURE 1, the general form of a typical booster body structure 10 is shown upon which is mounted one or more engines as at 11, having been encapsulated in accordance with the present invention. Booster engine fairings 12 are shown as a rearward portion of the body structure and are extended in appropriate fashion at 13 to provide pivotal connection with a canopy arrangement as hereinafter described.

The canopy portion, shown in an extended position enveloping the engine 11, is formed of two sections, each having a plurality of rib members 15 in pivotal connection with the extended fairing 13 of the booster body. Rib members 15 are of generally semi-circular form such as to readily conform with the contour of the booster body when nested in retracted position against the body 10. It may be seen that when so nested, the ribs will be removed from the operating components of the engine region so as to minimize interference with engine operation. In the latter regard, the ribs may have varying arc lengths so as to provide compact nesting when retracted against the booster frame.

The rib members of the canopy support a flexible fabric covering 16 formed of a material, the selection of which will depend upon the operational characteristics of the booster being utilized. For instance, the fabric should be as light as possible while retaining properties adequate to resist heat and atmospheric friction. In typical usage, an aluminized silicone rubber coated glass fabric will be found suitable.

The canopy arrangement is shown having lead ribs 18 and 19 on the outward side of each canopy portion.

These ribs are formed so as to join in mating relationship when extended over the engine region and will be seen to serve a multiple function. While having a generally semi-circular form similar to ribs 15, the lead ribs are enlarged so as to retain a higher structural rigidity. As described hereinafter, initial impact loads are absorbed by these members and, upon the opening of the canopy, the ribs have the broadest arcuate movement. The relatively deep web or channel configuration of the lead ribs may serve the additional function of providing an external protective covering for the ribs 15 and fabric 16 while retained in retracted position within the booster fairing 12 during engine operation and booster flight.

Attention is drawn to the pointed appendage attached to one or both of the lead ribs at 20, the center of their respective arcs. Initial contact with the surface is made at this point as the booster descends into the sea. At impact, the rearward portion of the booster is subjected to a shock wave and attendant pressure build-up. By subjecting the relatively low cross-sectional pointed appendage 20 to this preliminary pressure build-up, the load bearing requirement and consequently the resulting density of foamatious material within the canopy enclosure will be advantageously lessened. For example, at a sinking speed of 5 ft./sec., a pressure of 300 lbs./in.$^2$ will exist at point 20 for $4 \times 10^{-6}$ seconds. For a sinking speed of 10 ft./sec., a pressure of about 610 lbs./in.$^2$ will be present for $7.5 \times 10^{-6}$ seconds. To absorb the latter pressure, a relatively small appendage 20 having a "travel" or length of $7.5 \times 10^{-5}$ feet is required. In view of the foregoing, it may be seen that the configuration of appendage or point 20 will depend upon the design parameters of the booster system and that it may be formed in a variety of shapes including that of a relatively small spike. Further, the appendage may be formed as an integral portion of either or both lead ribs 18 and 19 or may be attached separately in any convenient fashion. The appendage 20 is shown on the drawing as having an extended form about the lead ribs so as to provide a more even distribution of impact forces about the entire encapsulating canopy. Of course, to retain the effectiveness of appendage 20 the booster recovery design system must allow for a relatively vertical attitude during descent of the vehicle to the earth's surface. The configuration depicted in the figure will be seen to allow for some variance in descent attitude.

Lead ribs 18 and 19 are movable into a closed position as depicted by appropriately positioned actuator cylinders, one of which is shown at 24. The choice of actuating device used for this purpose may vary widely. For example, the cylinders may be hydraulically, pneumatically or explosively actuated, or electric motor driving means may be utilized to close the canopy. It may be seen that the entire rib assembly is in pivotal connection with the booster body at trunnion assemblies, one of which is shown at 22. The interconnections of a typical trunnion, actuating cylinder and ribs are further described in connection with FIGURE 2.

During the encapsulating procedure and following the forming of the canopy from its retracted position, all or a selected number of the rib members are utilized as conduits for the delivery of appropriate foaming fluids and the like into the engine region. For this purpose, the entirety of a typical rib member or a portion thereof may be made hollow. Mounted upon the ribs are a plurality of nozzles 27 positioned so as to direct the flow of fluids into the engine region. The individual positioning of these nozzles will be dependent upon the booster engine arrangement and similar considerations so as to provide a uniform distribution of the foamatious material throughout the encapsulating chamber defined by the canopy and booster.

It may be seen that the configuration of the canopy may be altered to conform with a variety of structural requirements. For instance, the ribs may be stacked in retracted position on one side only of the booster, thereby requiring a lead rib of slightly altered design and fewer operating parts. The final configuration of the canopy will also depend upon the weighting and balance of the overall booster design.

Shown disposed in substantially uniform fashion within the encapsulating chamber is a rigid, closed cell foam 28 having been injected into the chamber through nozzles 27. The selection of an appropriate foaming material for the chamber is dependent upon parameters appropriate to the design, weight and re-entry characteristics of the booster body and the desired distribution of impact forces at surface contact. Typically, a booster having a sinking speed before impact of 10 ft./sec. will impose a maximum pressure of about 0.885 lb./in.$^2$ upon the foam supported enclosure. A resin base foam having a density of about 0.336 lb./ft.$^3$ will be capable of accepting such a load.

An appropriate selection of foam density will also contribute to the floatation capabilities of the booster. If necessary, judicious selection of foam density and enclosure volume will allow flotation of the entire booster even under conditions of fuel tank rupture.

The rigid foam is conventionally generated by intermixing within a common conduit a base and an expanding fluid just prior to spraying their mixture from nozzles. The timing required in mixing is dependent upon the curing period required to obtain sufficient foam rigidity and upon the mode or process of intermixture. Of course, the intermixture of the fluids deriving the foam may be effected by introducing both fluids simultaneously into the encapsulating chamber through separate conduiting.

As suggested, a variety of foamatious materials will be found suitable for use in the present invention depending upon booster design parameters. Generally, a polyether base resin, hereinafter referred to as a "resin," and fluorocarbon expanding agent will produce a satisfactory closed cell foam. Such a foam material is sold under the name Nopco H–602 by the Nopco Chemical Company, North Arlington, N.J.

Tankage for retaining the resin during flights is shown at 30. A tank for retaining the expanding agent is shown at 31 having a similar shape and located opposite tank 30. A tank or container for retaining silicone base isolating fluid is shown at 32. Each of the tanks is constructed to fit within the booster fairing 12 and may assume a variety of configurations dependent upon the exigencies of available space and overall booster balancing. Fluid is delivered from the tanks to the ribs at trunnion 22 through suitable conduiting 33. Distribution of the fluid may be effected by pumping from the tanks or pressurization of the tankage. The latter pressurization may be provided prior to flight or transmitted at an appropriate time from pressures available in other booster components such as oxidizer tanks and the like. Additionally, compressed gas containers having suitable valving may be utilized for this purpose.

The isolating fluid within tank 32 is sprayed from nozzles 27 onto engine components and the like within the encapsulated region prior to the operation wherein foamatious materials fill the canopy. The fluid serves the purpose of facilitating the ultimate removal of cured foam from recovered booster parts. It has been found that a conventional silicone base mold release is suitable for this purpose. Such fluids are marketed under the name DC–20 Silicone Mold Release by the Dow Corning Corporation, Midland, Michigan.

Figure 2:
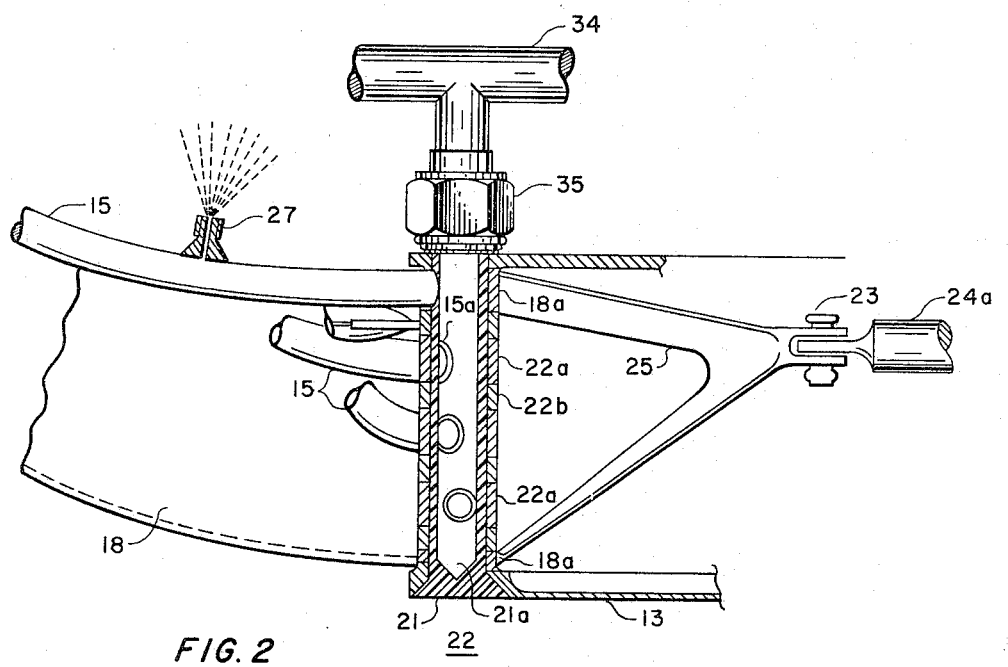
FIGURE 2 is a detailed view of a portion of the canopy apparatus of the invention, depicting a part of the fluid distribution system.

Turning to FIGURE 2, the distribution of fluids from the tankage at trunnion 22 is more clearly portrayed. Trunnion 22 comprises a stationary core member 21 formed within the extended fairing 13. Member 21 of the trunnion supports a plurality of outer sleeves 22a each of which in turn rotatably supports the canopy ribs 15 and 19. Separator bushings 22b provide appropriate vertical alignment for sleeves 22a and the attached rib member. Core member 21 is formed to provide an inner cavity 21a, closed at one end and in fluid distributing connection at the other end with conduiting 33 (FIGURE 1) from the tankage at a T union 34. It will be appreciated that T union 34 may be positioned at any convenient point within the conduiting system depending upon desired design conditions. Connection between T 34 and core 21 is provided by a typical threaded connector 35. Apertures or openings 15a are spaced within the wall of core member 21 so as to align in fluid distributing relationship with the hollow rib members upon the opening of the canopy to form an encapsulating enclosure. Lead rib 18 is shown fixed to sleeves 18a which are, in turn, in fixed connection with a bell crank 25. Rotation of lead rib 18 is thereby made in conjunction with the movement of bell crank 25. Crank 25 is in pivotal connection with driving rod 24a of the actuating cylinder 24 at a pin connection 23. It may be seen, therefore, that upon movement of rod 24a the attendant rotation of lead rib 18 will pull fabric 16 and attached ribs 15 into position. Further, the relative or incremental movement of ribs 15 will bring them into alignment with openings 15a to provide unobstructed passage of fluid from T 34 through nozzles 27.

The sequential operation of the encapsulating system as hereinbefore described in part operates as follows:

Following the separation of the booster stage from forward portions of the rocket in flight, the booster will commence a return path to the earth's surface. At a predetermined point in time a switching mechanism is actuated either by earth transmitted signals, pressure responsive switching, or by a simple elapsed time timing mechanism to energize re-entry attitude devices and thereby lower sinking speed. For this purpose, a parachute or like lowering device is deployed in suitably timed relationship with retrorocketing. The parachuting is typically arranged on the booster so as to lower it in a substantially vertically aligned position to the earth, such that the engine portion will strike the surface first. At a given point in time following separation of the booster stage, during or before parachute deployment, appropriate mechanism is utilized to purge the engines of excess fuel, thereby reducing total weight and cooling the engines. Following this procedure and at a convenient point in time, typically at the opening of the parachutes or the like, the actuating cylinders 24 and 26 will close the canopy, the silicone tank may be pressurized and the silicone isolating fluid sprayed into the engine and related components. At the completion of the silicone spray operation, expanding agent and resin will be united under pressure from the tankage and sprayed through the nozzles 27 into the encapsulating chamber. The foamatious material thereby formed around the engine parts will cure within a short period of time so as to form a stiff, impact resisting enclosure about the engines and related components. The booster will then strike the surface.

Figure 3:
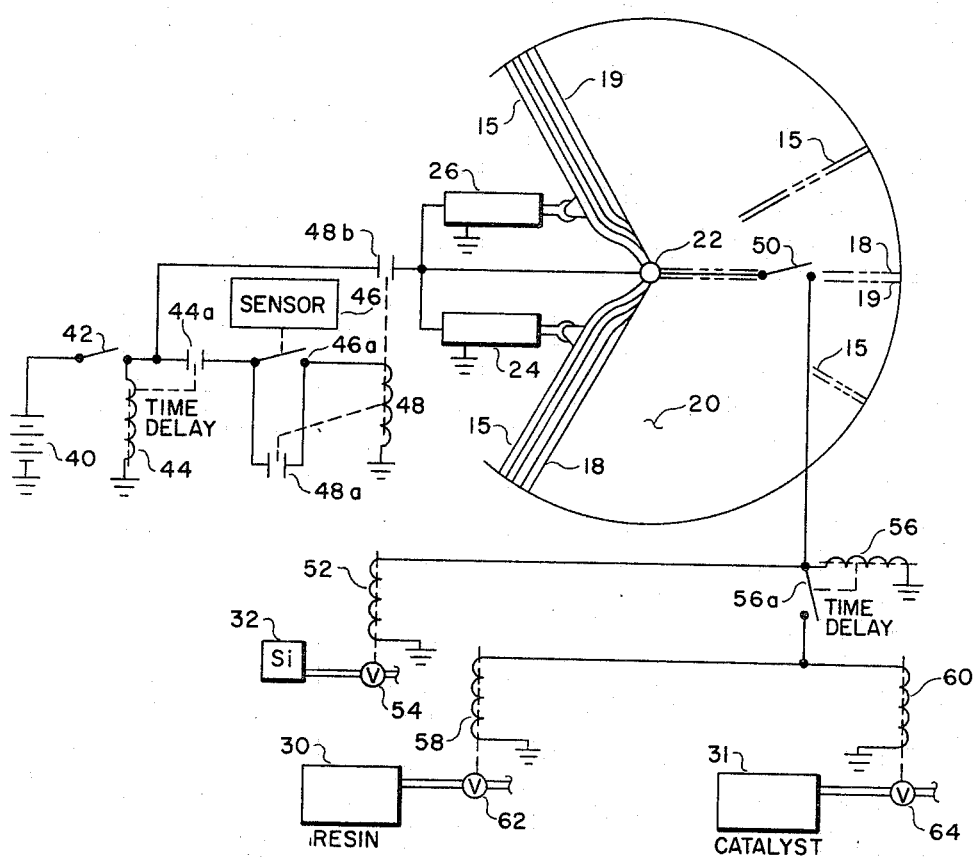
FIGURE 3 is a schematic diagram showing a control system for the present invention.

FIGURE 3 presents a schematic diagram of a generalized control system for effecting the operation of the canopy encapsulating system. Referring to the drawing, power is supplied to the system by a battery 40 or such energy as may be available from other systems within the booster. Arming switch 42 is closed before booster flight either manually or through an umbilical arrangement and in turn actuates a time delay mechanism 44. The lapse in time provided by the delay 44 adds sufficient redundancy to the switching arrangement so as to prevent a premature energization of the encapsulating system during critical periods of flight as may be caused by unanticipated external forces. Following an appropriate time lapse, a relay 44a will close, thereby arming a sensor mechanism 46. Sensor mechanism 46 serves to close switch 46a and may comprise any of a variety of actuating arrangements responsive to initiate the encapsulating process at the proper point in elapsed booster flight time. For instance, the sensor may be operable in response to altitude, booster fuel level, booster deceleration or other mechanical operation of various booster components such as may be associated with parachute deployment and the like. Relay coil 48 is energized at the closure of switch 46a and in turn closes a holding relay contact 48a and a relay contact 48b. At the closure of relay contact 48b actuator cylinders 24 and 26 are energized, lead ribs 18 and 19 in connection therewith are moved into position to form the enclosing canopy and as the closure of the canopy is completed, a contact sensing switch 50 is closed. As earlier described, the actuator cylinders may be selected from a variety of devices such as electric motors, pneumatic or explosively energized cylinders, or hydraulic mechanisms.

The closure of switch 50 energizes solenoid 52 which in turn opens a valve 54 to release a silicone or isolating fluid from tank 32 into appropriate conduiting for delivery within the encapsulating chamber.

Switch 50 also energizes a time delay mechanism 56 which serves to close switch 56a following a lapse of time sufficient to complete the delivery of silicone fluid into the encapsulating chamber. At the closure of switch 56a, solenoids 58 and 60 will cause the opening respectively of valves 62 and 64. Upon opening, these valves simultaneously release resin material from tank 30 and expanding agent from tank 31 to ultimately unite and form a rigid foam within the encapsulating enclosure.

From the foregoing description, it may be seen that a variety of control systems will be adaptable to the encapsulating procedure and apparatus of the invention. Final system design will be dependent upon the configuration and operational characteristics of the booster missile employed.

Through the unique provisions for encapsulation as above described, a booster recovery arrangement is furnished providing advantageous reductions in weight and allowing sufficient structural rigidity. Although the invention has been described by reference to schematic drawings of a preferred embodiment, such reference is to be understood in an instructive rather than a restrictive sense, many variants being possible within the scope of the claims hereunto appended.

What is claimed is:

1. A device for protecting the engine portion of a rocket booster body comprising:
    (a) a collapsible canopy in connection with said booster body and disposed in surrounding relationship about said engine portion;
    (b) actuating means in connection with said canopy and adapted to extend said canopy about said engine portion in a manner defining a chamber encapsulating said engine;
    (c) an appendage of decreasing cross-sectional dimension in connection with and extending outwardly from said canopy, for absorbing and distributing impact loads; and
    (d) means for substantially filling said encapsulating chamber with a quick-curing mixture whereby said engine portion is encapsulated within a shock absorbing media.

2. A device for protecting the exposed engine portion of a rocket booster body for effecting its recovery in a salvable condition following operation comprising:
    (a) a collapsible canopy including:
        a plurality of rib members in pivotal connection with said booster body, and
        a flexible covering associated with said ribs members and defining with said rib members and said booster body an enclosure for encapsulating said engine portion;
    (b) actuating means in connection with said booster body and said canopy, adapted to retain said canopy in a closed compact form upon said booster body in a substantially noninterfering position spaced from said engine portion during the operation of said engine portion, and adapted to pivot said ribs in spaced relationship about said engine portion so as to form an encapsulating chamber with said booster body at a point in time following the operation of said engine portion; and
(c) means for filling said encapsulating chamber with a quick-curing, foamable mixture.

3. A device for protecting the exposed engine portion of a rocket booster body as defined in claim 2 including an appendage of decreasing cross-sectional dimension in connection with and extending outwardly from said canopy for absorbing and distributing impact loads.

4. A device for protecting the exposed engine portion of a rocket booster body as defined in claim 2 in which at least one of said rib members is hollow and is adapted to introduce said foamable mixture within said encapsulating chamber.

5. A device for protecting the exposed engine portion of a rocket booster body for effecting its recovery in a salvable condition following operation comprising:
(a) a collapsible canopy including:
a plurality of rib members in pivotal connection with said booster body, and
a flexible covering associated with said rib members and defining with said rib members and said booster body an enclosure for encapsulating said engine portion;
(b) actuating means in connection with said booster body and said canopy, adapted to retain said canopy in a closed compact form upon said booster body in a substantially noninterfering position spaced from said engine portion during the operation of said engine portion, and adapted to pivot said ribs in spaced relationship about said engine portion so as to form an encapsulating chamber with said booster body at a point in time following the operation of said engine portion;
(c) means for filling said encapsulating chamber with a quick-curing, foamable mixture; and
(d) means for substantially coating said engine portion with an isolating fluid prior to filling said chamber with said foamable mixture, so as to facilitate the ultimate removal of said foamable mixture from said engine portion.

6. A device for protecting the exposed engine portion of a rocket booster body as defined in claim 5 in which at least one of said rib members is hollow and is adapted to introduce said foamable mixture within said encapsulating chamber.

7. A device for protecting the exposed engine portion of a rocket booster body as defined in claim 5 including an appendage of decreasing cross-sectional dimension in connection with and extending outwardly from said canopy for absorbing and distributing impact loads.

8. A device for protecting the exposed engine portion of a rocket booster body for effecting its recovery in a salvable condition following operating comprising:
(a) a collapsible canopy including:
a plurality of rib members in pivotal connection with said booster body,
a first flexible covering associated with a portion of said rib members, and
a second flexible covering associated with the remainder of said rib members;
(b) actuating means in connection with said booster body and said canopy, adapted to retain said canopy in a closed compact form upon said booster body in a substantially noninterfering position spaced from said engine portion during the operation of said engine portion, and adapted to pivot said ribs in spaced relationship about said engine portion so as to form an encapsulating chamber with said booster body at a point in time following the operation of said engine portion;
(c) means for filling said encapsulating chamber with a quick-curing, foamable mixture; and
(d) means for substantially coating said engine portion with an isolating fluid prior to filling said chamber with said foamable mixture, so as to facilitate the ultimate removal of said foamable mixture from said engine portion.

9. A device for protecting the exposed engine portion of a rocket booster body as defined in claim 8 including an appendage of decreasing cross-sectional dimension in connection with and extending outwardly from said canopy for absorbing and distributing impact loads.

10. A device for protecting the exposed engine portion of a rocket booster body as defined in claim 8 in which at least one of said rib members is hollow and is adapted to introduce said foamable mixture within said encapsulating chamber.

11. A device for protecting the exposed engine portion of a rocket booster body for effecting its recovery in a salvable condition comprising:
(a) a collapsible canopy, having a plurality of rib members, in pivotal connection with said booster body, said canopy being extensible about said engine portion so as to define with said booster body an encapsulating chamber;
(b) actuating means in connection with said booster body and said canopy, adapted to retain said canopy in a closed compact form upon said booster body in a substantially noninterfering position spaced from said engine portion during the operation of the engine portion and adapted to extend said canopy about said engine portion at a point in time following the operation of the engine portion;
(c) conduit means in connection with at least one of said rib members, adapted to transmit fluid into said encapsulating chamber;
(d) storage means in connection with said booster body and said conduit means for retaining foamable resinous fluid, a catalyst fluid and a silicone base isolating fluid; and
(e) pressure deriving means in connecting with said conduit means and said storage means for impelling said fluids into said conduit means and encapsulating chamber so as to substantially fill said encapsulating chamber with a quick-curing, foamatious mixture.

12. A device for protecting the exposed engine portion of a rocket booster body as defined in claim 11 in which said conduit means includes at least one of said rib members, said rib members being hollow and adapted to introduce said foamable mixture within said encapsulating chamber.

13. A device for protecting the exposed engine portion of a rocket booster body for effecting its recovery in a salvable condition comprising:
(a) a collapsible canopy, having a plurality of rib members, in pivotal connection with said booster body, said canopy being extensible about said engine portion so as to define with said booster body an encapsulating chamber;
(b) an appendage of decreasing cross-sectional dimension in connection with and extending outwardly from said canopy, for absorbing and distributing impact loads;
(c) actuating means in connection with said booster body and said canopy, adapted to retain said canopy in a closed compact form upon said booster body in a substantially noninterfering position spaced from said engine portion during the operation of the engine portion and adapted to extend said canopy about said engine portion at a point in time following the operation of the engine portion;
(d) conduit means in connection with at least one of said rib members, adapted to transmit fluid into said encapsulating chamber;
(e) storage means in connection with said booster body and said conduit means for retaining foamable resinous fluid, an expanding agent and a silicone base isolating fluid; and
(f) pressure deriving means in connection with said conduit means and said storage means for impelling said fluids into said conduit means and encapsulating chamber so as to substantially fill said encapsulating chamber with a quick-curing foamatious mixture.

14. A device for protecting the exposed engine portion of a rocket booster body as defined in claim 13 in which said conduit means includes at least one of said rib members, said rib member being hollow and adapted to introduce said foamatious mixture within said encapsulating chamber.

15. A device for protecting the exposed engine portion of a rocket booster body for effecting its recovery in a salvable condition comprising:
(a) a collapsible canopy, having a plurality of rib members, in pivotal connection with said booster body, said canopy being extensible about said engine portion so as to define with said booster body an encapsulating chamber;
(b) an appendage of decreasing cross-sectional dimension in connection with and extending outwardly from said canopy, for absorbing and distributing impact loads;
(c) actuating means in connection with said booster body and said canopy, adapted to retain said canopy in a closed compact form upon said booster body in a substantially noninterfering position spaced from said engine portion during the operation of the engine portion and adapted to extend said canopy about said engine portion at a point in time following the operation of the engine portion;
(d) conduit means in connection with at least one of said rib members, adapted to transmit fluid into said encapsulating chamber;
(e) storage means in connection with said booster body and said conduit means for retaining foamable resinous fluid, an expanding agent and a silicone base isolating fluid;
(f) pressure deriving means in connection with said conduit means and said storage means for impelling said fluids into said conduit means and encapsulating chamber;
(g) control means associated with said actuating means and said pressure deriving means adapted to energize said actuating means whereby said canopy is extended about said engine portion, and to, in turn, actuate said pressure deriving means so as to respectively impel said isolating fluid and said resinous fluid and expanding agent into the encapsulating chamber.

16. A device for protecting the exposed engine portion of a rocket booster body as defined in claim 15 in which said conduit means includes at least one of said rib members, said rib member being hollow and adapted to introduce said foamatious mixture within said encapsulating chamber.

17. A device for protecting the exposed engine portion of a rocket booster body for effecting its recovery in a salvable condition comprising:
(a) a collapsible canopy member including:
a plurality of rib members in pivotal connection with said booster body,
a flexible covering associated with said rib members and defining with said rib members and booster body an enclosure for encapsulating said engine portion;
(b) actuating means in connection with said booster body and said canopy member, adapted to retain said canopy member in a closed compact form upon said booster body in a substantially noninterfering position spaced from said engine portion during the operation of said engine portion and adapted to pivot said ribs in spaced relationship about said booster body so as to form an encapsulating chamber with said booster body about said engine portion at a point in time following the operation of said engine portion;
(c) an appendage of decreasing cross-sectional dimension in connection with and extending outwardly from said canopy, for absorbing and distributing impact loads;
(d) first storage means associated with said booster body for retaining a foamable fluid mixture;
(e) second storage means in association with said booster body for retaining an expanding agent for expanding and curing the said foamable fluid mixture;
(f) third storage means in association with said booster body for retaining an isolating silicone base fluid;
(g) conduit means in connection with each said first, second and third storage means for distributing fluids from said storage means to within said encapsulating enclosure;
(h) pressure deriving means in connection with said conduit means and said first, second and third storage means for delivering fluid into said enclosure; and
(i) control means in connection with said pressure deriving means and said actuating means and operable therewith to, in sequentially timed relationship, respectively cause the encapsulation of said engine portion with said canopy member at a predetermined point in time and selectively actuate said pressure deriving means so as to deliver said isolating fluid and in turn to deliver simultaneously said foamable fluid and said expanding agent into said encapsulating enclosure.

References Cited by the Examiner
UNITED STATES PATENTS
3,229,936  1/1966  Quillinan _____ 244—138

MARK NEWMAN, *Primary Examiner.*
D. HART, *Assistant Examiner.*